United States Patent
Kawai

(10) Patent No.: US 10,305,112 B2
(45) Date of Patent: May 28, 2019

(54) ELECTROCHEMICAL DEVICE ELECTRODE, ELECTROCHEMICAL DEVICE, AND METHOD FOR MANUFACTURING ELECTROCHEMICAL DEVICE ELECTRODE

(71) Applicant: TAIYO YUDEN CO., LTD., Taito-ku, Tokyo (JP)

(72) Inventor: Yuki Kawai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 55 days.

(21) Appl. No.: 15/636,567

(22) Filed: Jun. 28, 2017

(65) Prior Publication Data
US 2018/0006310 A1   Jan. 4, 2018

(30) Foreign Application Priority Data
Jul. 4, 2016   (JP) .................................. 2016-132233

(51) Int. Cl.
*H01M 4/66*     (2006.01)
*H01G 11/52*    (2013.01)
(Continued)

(52) U.S. Cl.
CPC ............ *H01M 4/667* (2013.01); *H01G 11/28* (2013.01); *H01G 11/52* (2013.01); *H01G 11/68* (2013.01); *H01G 11/70* (2013.01); *H01G 11/86* (2013.01); *H01M 4/0404* (2013.01); *H01M 4/0471* (2013.01); *H01M 4/587* (2013.01); *H01M 4/622* (2013.01); *H01M 4/623* (2013.01); *H01M 4/625* (2013.01); *H01M 4/661* (2013.01);
(Continued)

(58) Field of Classification Search
CPC .. H01M 4/667; H01M 4/0404; H01M 4/0471; H01M 4/587; H01M 4/622; H01M 4/623; H01M 4/625; H01M 4/661; H01M 4/663; H01M 4/668; H01M 10/0525; H01G 11/28; H01G 11/52; H01G 11/68; H01G 11/70; H01G 11/86; H01G 11/06; H01G 11/34; H01G 11/62
See application file for complete search history.

(56) References Cited

FOREIGN PATENT DOCUMENTS

| CN | 102760887 A | 10/2012 |
|---|---|---|
| CN | 104254940 A | 12/2014 |

(Continued)

OTHER PUBLICATIONS

First Office Action issued by the State Intellectual Property Office of China on Aug. 28, 2018 for Chinese counterpart application No. 201710536597.5.

(Continued)

*Primary Examiner* — Helen Oi K Conley
(74) *Attorney, Agent, or Firm* — Law Office of Katsuhiro Arai

(57) ABSTRACT

An electrochemical device electrode has a current collector, alkalescent resin layers, conductive layers, and active material layers. The current collector is an acid-etched metal foil whose surface has concavities. The alkalescent resin layers are formed and desiccated inside the concavities and exhibit weak alkalinity. The conductive layers are formed on the current collector and the alkalescent resin layers, contain conductive material, and are electrically connected to the current collector. The active material layers are formed on the conductive layers.

9 Claims, 6 Drawing Sheets

(51) Int. Cl.
  *H01G 11/68* (2013.01)
  *H01G 11/70* (2013.01)
  *H01G 11/86* (2013.01)
  *H01M 4/04* (2006.01)
  *H01M 4/587* (2010.01)
  *H01M 4/62* (2006.01)
  *H01G 11/28* (2013.01)
  *H01G 11/06* (2013.01)
  *H01G 11/34* (2013.01)
  *H01G 11/62* (2013.01)
  *H01M 10/0525* (2010.01)

(52) U.S. Cl.
  CPC .......... *H01M 4/663* (2013.01); *H01M 4/668* (2013.01); *H01G 11/06* (2013.01); *H01G 11/34* (2013.01); *H01G 11/62* (2013.01); *H01M 10/0525* (2013.01); *Y02E 60/13* (2013.01)

(56) References Cited

FOREIGN PATENT DOCUMENTS

| | | |
|---|---|---|
| CN | 105074979 A | 11/2015 |
| JP | 109245777 A | 9/1997 |
| JP | 2005136401 A | 5/2005 |
| JP | 2005191423 A | 7/2005 |
| JP | 2010205517 A | 9/2010 |
| JP | 2011151143 A | 8/2011 |
| JP | 2012059396 A | 3/2012 |
| JP | 2012227274 A | 11/2012 |
| JP | 2014211960 A | 11/2014 |
| WO | 2015115177 A1 | 8/2015 |

OTHER PUBLICATIONS

Notification of Reasons for Refusal issued by the Japanese Patent Office, dated Nov. 20, 2018, for Japanese counterpart application No. 2016-132233.

Neckers et al., Oganic Chemistry, Nov. 30, 1984, 344-346.

ELECTROCHEMICAL DEVICE ELECTRODE, ELECTROCHEMICAL DEVICE, AND METHOD FOR MANUFACTURING ELECTROCHEMICAL DEVICE ELECTRODE

BACKGROUND

Field of the Invention

The present invention relates to an electrochemical device electrode that includes a current collector and active material layers, as well as an electrochemical device and a method for manufacturing such electrochemical device electrode.

Description of the Related Art

With an electrical double-layer capacitor or other electrochemical device, a capacitor electrode that constitutes a part of the device is constituted, for example, by forming conductive layers on the top and bottom sides of a current collector made of an aluminum foil, and then forming active material layers containing active material and binder on these conductive layers (refer to Patent Literature 1, for example).

In Patent Literature 1, for example, the capacitor electrode is constituted by: a current collector made of an etched aluminum foil; undercoat layers (corresponding to conductive layers) containing conductive grains and fluororubber that are formed on the current collector; and electrode layers (corresponding to active material layers) formed on the undercoat layers.

Background Art Literatures

[Patent Literature 1] Japanese Patent Laid-open No. 2005-191423

SUMMARY

However, use of an etched aluminum foil as the current collector may cause the acid used when etching the aluminum foil to remain on the aluminum foil even after thorough washing. Electrochemical devices having electrodes that use current collectors on which the acid remains as described above, present a problem in that the acid reaches the active material layer over time and reacts with the binder constituting a part of the active material layer, thereby altering the binder and causing the active material layer to separate due to weakened tackiness, and the capacitor characteristics deteriorate as a result.

In light of the aforementioned situation, an object of the present invention is to provide an electrochemical device electrode that demonstrates stable capacitor characteristics for an extended time, as well as an electrochemical device and a method for manufacturing such electrochemical device electrode.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electrochemical device electrode pertaining to an embodiment of the present invention has a current collector, alkalescent resin layers, conductive layers, and active material layers.

The current collector is an etched metal foil whose surface has concavities constituted by recessed parts and projecting parts on its surfaces, i.e., the surface has microscopic irregularities.

The alkalescent resin layers are formed and desiccated inside the recessed parts of the current collector and its pre-desiccated state exhibits weak alkalinity.

The conductive layers are formed on the surfaces of the current collector including the alkalescent resin layers, contain conductive material, and are electrically connected to the current collector.

The active material layers are formed on the conductive layers.

According to an electrochemical device electrode pertaining to the present invention, the alkalescent resin layers formed inside the recessed parts of the current collector neutralize the residues of the acid used for etching the current collector, which suppresses the acid from reaching the active material layers and therefore the active material layers will not be altered by the acid. Electrochemical devices having such electrochemical device electrodes will have stable capacitor characteristics for an extended time.

The alkalescent resin layers, in a pre-desiccated state (typically at room temperature), exhibit weak alkalinity and have a pH of higher than 7.0 but no higher than 10 (in some embodiments, a pH of about 7.2 or higher; in some embodiments, a pH of no higher than about 8.5). Typically, if the pH is lower than 7.2, sufficient neutralizing effect cannot be achieved; if the pH is higher than 10, on the other hand, electrical conductivity deteriorates.

The alkalescent resin layers are made of at least one of ammonium salt of carboxy methyl cellulose, sodium salt of carboxy methyl cellulose, and polyethylene oxide that has been adjusted to alkalinity. In other words, ammonium salt of carboxy methyl cellulose, sodium salt of carboxy methyl cellulose, or polyethylene oxide, that has been adjusted to alkalinity, or specifically a resin that exhibits weak alkalinity, may be used for the alkalescent resin layers.

The metal foil is an aluminum foil. In other words, an etched aluminum foil may be used for the current collector.

The active material layers contain active material and resin that includes at least one of styrene butadiene rubber, polyvinylidene fluoride, tetrafluoroethylene (PTFE), acrylic resin, polyimide resin, and polyamide resin.

An electrochemical device pertaining to an embodiment of the present invention has electrochemical device electrodes.

The electrochemical device electrodes each have: a current collector which is an etched metal foil having recessed parts and projecting parts on its surfaces; alkalescent resin layers which are formed inside the recessed parts of the current collector and which exhibit weak alkalinity; conductive layers which are formed on the current collector and alkalescent resin layers, and which contain conductive material, and which are electrically connected to the current collector; and active material layers formed on the conductive layers.

According to an electrochemical device pertaining to the present invention, the alkalescent resin layers formed inside the recessed parts of the current collector neutralize the residues of the acid used for etching the current collector, which inhibits the acid from reaching the conductive layers and active material layers and therefore the conductive layers and active material layers will not be altered by the acid and separate as a result. This way, stable capacitor characteristics can be obtained for an extended time.

A method for manufacturing an electrochemical device electrode pertaining to an embodiment of the present invention comprises forming of recesses and projections on a current collector, forming of alkalescent resin layers, forming of conductive layers, and forming of active material layers.

As for the forming of the recesses and projections, an acid is used to etch a current collector, which is a metal foil, to form recesses and projections on its surfaces.

As for the forming of the alkalescent resin layers, an alkalescent resin material is applied on the surfaces of the current collector, and then dried, to form alkalescent resin layers in the recessed parts of the current collector.

As for the forming of the conductive layers, conductive layers are formed on the current collector and alkalescent resin layers.

As for the forming of the active material layers, active material layers are formed on the surfaces of the conductive layers.

According to the method for manufacturing an electrochemical device electrode pertaining to the present invention, the alkalescent resin layers are formed by applying and then drying an alkalescent resin material so that the alkalescent resin layers will be formed inside the recessed parts of the current collector.

This way, electrical conductivity with the conductive layers is ensured in the projecting parts of the current collector that are not covered with the alkalescent resin layers. Also, the alkalescent resin layers formed inside the recessed parts of the current collector neutralize the residues of the acid used for etching the current collector, and therefore the active material layers will not be altered by such acid residues. Electrochemical devices having electrochemical device electrodes that have been manufactured this way will have stable capacitor characteristics for an extended time.

The alkalescent resin material is at least one of aqueous solution of ammonium salt of carboxy methyl cellulose, aqueous solution of sodium salt of carboxy methyl cellulose, and aqueous solution prepared by adding aqueous solution of diluted sodium carbonate to aqueous solution of polyethylene oxide. In other words, at least one of aqueous solution of ammonium salt of carboxy methyl cellulose, aqueous solution of sodium salt of carboxy methyl cellulose, and aqueous solution prepared by adding aqueous solution of diluted sodium carbonate to aqueous solution of polyethylene oxide, may be used for the alkalescent resin material.

As described above, according to the present invention an electrochemical device electrode that can suppress alteration of the active material layers due to residues of the acid used for etching the current collector, and thereby provide improved long-term reliability in terms of stable capacitor characteristics for an extended time, can be obtained, as well as an electrochemical device and a method for manufacturing such electrochemical device electrode.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
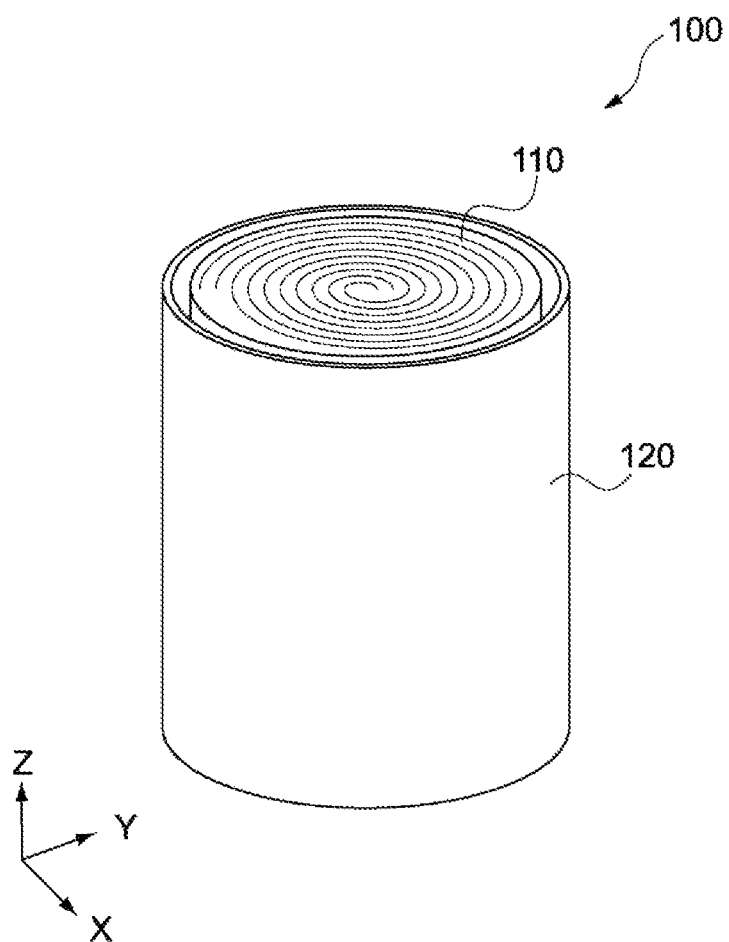
FIG. 1 is a perspective view of an electrochemical device pertaining to an embodiment of the present invention.

100 Electrochemical device
110 Electric storage element
130 Negative electrode
132 Negative-electrode collector
132a Projecting part
132b Recessed part
133 Negative-electrode active material layer
135 Negative-electrode alkalescent resin layer
135a Aqueous solution of ammonium salt of carboxy methyl cellulose
136 Negative-electrode conductive layer
140 Positive electrode
142 Positive-electrode collector
142a Projecting part
142b Recessed part
143 Positive-electrode active material layer
145 Positive-electrode alkalescent resin layer
146 Positive-electrode conductive layer

DETAILED DESCRIPTION OF EMBODIMENTS

An embodiment of the present invention is explained below by referring to the drawings. The drawings may introduce the XYZ-axis coordinate system as necessary.

An electrochemical device 100 pertaining to this embodiment is explained. The electrochemical device 100 may be an electrical double-layer capacitor. Also, the electrochemical device 100 may be a lithium ion capacitor, lithium ion secondary battery, or other type of electrochemical device that can be charged and discharged.

[Constitution of Electrochemical Device]

FIG. 1 is a perspective view showing the constitution of the electrochemical device 100 pertaining to this embodiment. The electrochemical device 100 shown in FIG. 1 comprises an electric storage element 110 housed in a container 120 (its lid and terminals are not illustrated). Along with the electric storage element 110, electrolytic solution (not illustrated) is housed in the container 120.

Figure 2:
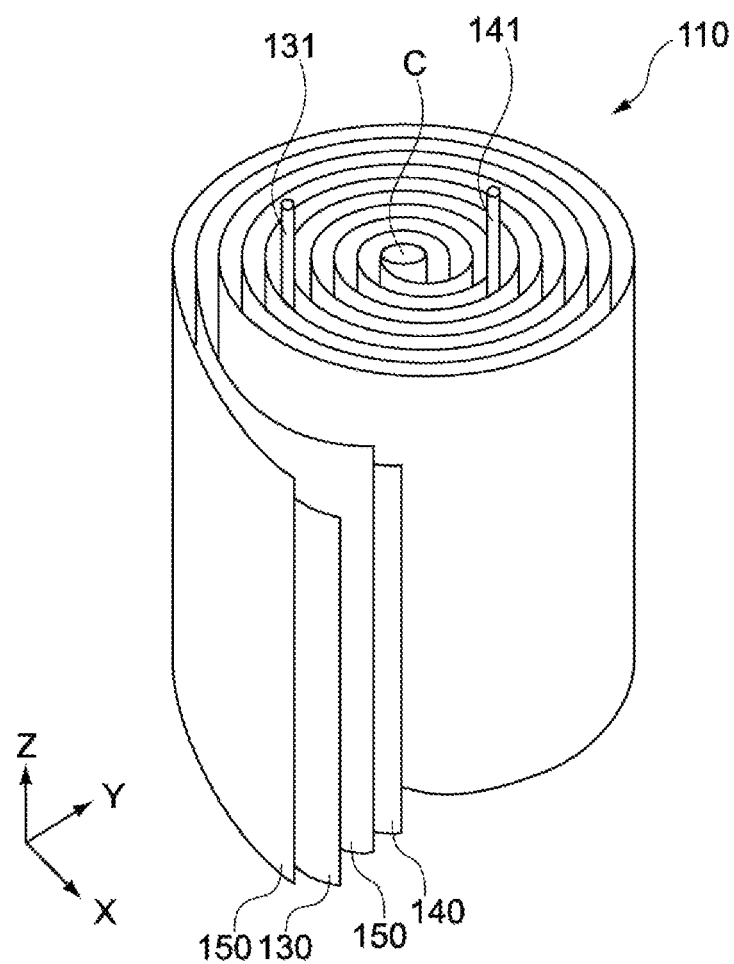
FIG. 2 is a perspective view of the electric storage element in the electrochemical device.

FIG. 2 is a perspective view of the electric storage element 110. As shown in FIG. 2, the electric storage element 110 has a negative electrode 130 and a positive electrode 140, each being an electrochemical device electrode, as well as separators 150, all of which are stacked together, and the resulting laminate is wound around a winding core C. The direction in which the winding core C extends, or specifically the direction parallel with the center axis of winding, is hereinafter referred to as the Z direction. The X direction represents the direction orthogonal to the Z direction, and the Y direction represents the direction orthogonal to the X direction and the Z direction. It should be noted that the winding core C need not be provided.

The order in which the negative electrode 130, positive electrode 140, and separators 150 constituting the electric storage element 110 are stacked is, as shown in FIG. 2, "separator 150, negative electrode 130, separator 150, positive electrode 140," toward the winding core C (from the outer side of winding).

The electric storage element 110 has a negative-electrode terminal 131 joined to the negative electrode 130, and a positive-electrode terminal 141 joined to the positive-electrode 140. The negative-electrode terminal 131 and positive-electrode terminal 141 are led out to the outside from the electric storage element 110, respectively.

[Constitutions of Negative and Positive Electrodes of Electric Storage Element]

Figure 3:
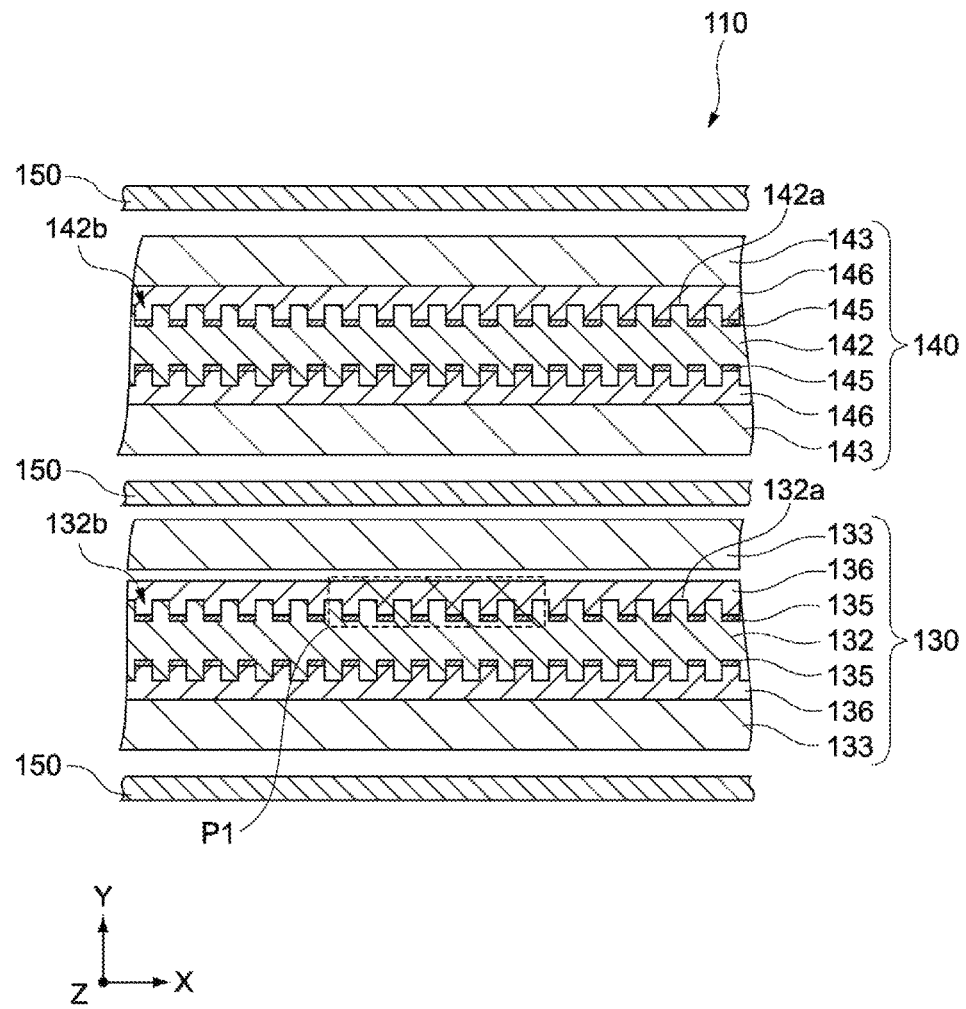
FIG. 3 is a cross sectional view of the electric storage element.

FIG. 3 is a cross-sectional view of the electric storage element 110. FIG. 3 shows a condition of the electric storage element 110 in which the negative electrode 130, positive electrode 140, and separators 150, extend in parallel along the X-Z plane; however, the negative electrode 130, positive electrode 140, and separators 150, may be outwardly curved, as shown in FIG. 2.

Figure 4:
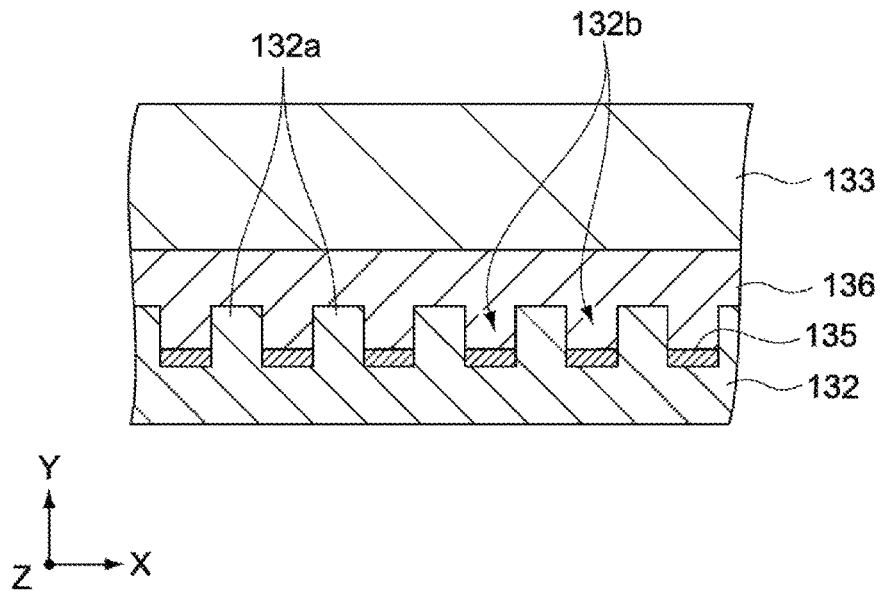
FIG. 4 is an enlarged cross sectional view of a part of the negative electrode.

FIG. 4 is an enlarged cross-sectional view of a part of the negative electrode 130. For example, FIG. 4 is a schematic representation of the area inside P1 in FIG. 3.

As shown in FIG. 3, the negative electrode 130 has a negative-electrode collector 132, negative-electrode alkalescent resin layers 135, negative-electrode conductive layers 136, and negative-electrode active material layers 133.

Recesses and projections are formed on the top and bottom sides of the negative-electrode collector 132, and the negative-electrode alkalescent resin layers 135 are formed inside these recessed parts 132b. On the top and bottom sides of the negative-electrode collector 132 including the negative-electrode alkalescent resin layers 135, the negative-electrode conductive layers 136 are formed in a manner sandwiching the negative-electrode collector 132. Furthermore, the negative-electrode active material layers 133 are formed on the negative-electrode conductive layers 136 in a manner sandwiching the negative-electrode collector 132 and negative-electrode conductive layers 136.

As shown in FIGS. 3 and 4, the negative-electrode collector 132 is provided at the center of the negative electrode 130. The negative-electrode collector 132 is a metal foil. This metal foil is an aluminum foil, for example. The metal foil in this embodiment is an etched aluminum foil that has been etched, in which multiple through holes are formed or whose surfaces are roughened to form recessed parts 132b and projecting parts 132a on them.

Use of the negative-electrode collector 132 having recesses and projections on its surfaces improves the adhesion strength between the negative-electrode collector 132 and the negative-electrode active material layers 133 via the negative-electrode collector 132 and negative-electrode conductive layers 136. Also, providing recesses and projections on the surfaces increases the effective electrode area, which means that large capacitance can be obtained despite a small size.

The negative-electrode alkalescent resin layers 135 are formed inside the recessed parts 132b of the negative-electrode collector 132. The negative-electrode alkalescent resin layers 135 are made of ammonium salt of carboxy methyl cellulose. In addition to ammonium salt of carboxy methyl cellulose, sodium salt of carboxy methyl cellulose or polyethylene oxide that has been adjusted to alkalinity may also be used for the negative-electrode alkalescent resin layers 135.

In the above, when an etched aluminum foil is used for the negative-electrode collector 132, the acid used in the etching solution tends to remain in the recessed parts 132b, and this acid causes the negative-electrode active material layers 133 to separate. To prevent this from happening, in this embodiment the negative-electrode alkalescent resin layers 135 are provided in the recessed parts where the acid tends to remain, so that the remaining acid is neutralized by the negative-electrode alkalescent resin layers 135 and therefore the acid is prevented from reaching the negative-electrode active material layers 133. This way, alteration of the negative-electrode active material layers 133 by the acid can be prevented, and an electrochemical device having stable capacitor characteristics for an extended time can be obtained.

Ideally the negative-electrode alkalescent resin layers 135 are formed in a manner covering the bottoms, or the bottoms and parts of the side faces, of the recessed parts 132b, and ideally at least parts of the side faces in the recessed parts 132b are not covered by the negative-electrode alkalescent resin layers 135, and the aluminum surface is exposed.

If the recessed parts 132b are completely filled with the negative-electrode alkalescent resin layers 135, for example, acid leak can be prevented, but no recesses and projections on the surfaces of the negative-electrode collector 132 will be formed, and the effect of improved adhesion strength due to formation of recesses and projections can no longer be obtained. In addition, the negative-electrode alkalescent resin layers 135 have insulating property, so if all aluminum surfaces inside the recessed parts 132b are covered with the negative-electrode alkalescent resin layers 135, electrical conductivity will be lost and the effect of increased effective electrode area due to setting of recesses and projections can no longer be obtained.

Accordingly, ideally the negative-electrode alkalescent resin layers 135 are provided in a manner covering parts of the faces forming the recessed parts 132b, or preferably the bottoms of the recessed parts 132b where the acid tends to remain. This way, the adhesion strength can be improved and the effective electrode area can be enlarged, while at the same time stable capacitor characteristics can be obtained for an extended time.

It should be noted that, while the foregoing explained an example where the recessed parts 132b are not through holes that penetrate the aluminum foil from the top side to the bottom side, they may be through holes. If the recessed parts 132b are through holes, the negative-electrode alkalescent resin layers 135 should be formed so that some areas of the side faces of these through holes are covered by the negative-electrode alkalescent resin layers 135, but the through holes are not blocked. This reduces the amount of acid reaching the negative-electrode active material layers 133.

The negative-electrode conductive layers 136 are formed on the negative-electrode alkalescent resin layers 135 and negative-electrode collector 132, and electrically connected to the negative-electrode collector 132 in the projecting parts 132a and also in the areas of the recessed parts 132b not covered by the negative-electrode alkalescent resin layers 135. The negative-electrode conductive layers 136 contain conductive material. This conductive material is at least one of carbon black, graphite, and the like, for example.

The negative-electrode active material layers 133 are formed on the negative-electrode conductive layers 136. In the example of FIG. 3, the negative-electrode collector 132 is sandwiched by the negative-electrode active material layers 133 provided on both sides of the negative-electrode collector 132. The negative-electrode active material layers 133 are made of a substance that causes electrolytic ions (such as $BF_4^-$) to be adsorbed onto the surfaces of the negative-electrode conductive layers 136 to form electrical double layers.

The negative-electrode active material layers 133 contain active material, binder, and conductive auxiliary agent.

The active material contains at least one of active carbon, artificial graphite, PAS (polyacenic semiconductor), etc.

For the binder, any binder that contains at least one of styrene butadiene rubber (SBR), polyvinylidene fluoride, tetrafluoroethylene (PTFE), acrylic resin, polyimide resin, and polyamide resin may be used, and in this embodiment, styrene butadiene rubber was used. For example, styrene butadiene rubber is altered when it reacts with an acid, in which case its tackiness will weaken and this can cause the negative-electrode active material to separate. In this embodiment, alteration of the binder can be prevented because residue of the acid used for etching, which causes separation, is neutralized by the negative-electrode alkalescent resin layers 135 and thus the acid is prevented from reaching the negative-electrode conductive layers 136 and negative-electrode active material layers 133. As described above, providing the negative-electrode alkalescent resin layers 135 makes it possible to use various binders for the negative-electrode active material layers, and the scope of material selection widens as a result.

The conductive auxiliary agent is constituted by gains made of conductive material, and improves the electrical conductivity between the negative-electrode active materials. For the conductive auxiliary agent, acetylene black, graphite, carbon black, Ketjenblack, carbon nanotubes, etc., may be used, for example, and any one of the foregoing may be used alone or two or more of them may be mixed. It should be noted that the conductive auxiliary agent may be constituted by any metal material, conductive polymer, or the like, so long as the material has electrical conductivity. In this embodiment, Ketjenblack was used.

In this embodiment, an active material layer formation paste containing active material, binder, and conductive auxiliary agent was applied and dried to form active material layers to be used as the negative-electrode active material layers 133, the details of which are described later; however, a mixture of active material, conductive auxiliary agent, and synthetic resin (such as PTF (polytetrafluoroethylene)) may be rolled into the shape of a sheet, and cuttings from this sheet may be used instead.

The positive electrode 140 has a positive-electrode collector 142, positive-electrode alkalescent resin layers 145, positive-electrode conductive layers 146, and positive-electrode active material layers 143.

Recessed parts 142b and projecting parts 142a are formed on the top and bottom sides of the positive-electrode collector 142, and the positive-electrode alkalescent resin layers 145 are formed inside these recessed parts 142b. On the positive-electrode alkalescent resin layers 145 and positive-electrode collector 142, the positive-electrode conductive layers 146 are formed in a manner sandwiching the positive-electrode collector 142. Furthermore, the positive-electrode active material layers 143 are formed on the positive-electrode conductive layers 146 in a manner sandwiching the positive-electrode collector 142 and positive-electrode conductive layers 146.

The positive-electrode collector 142 is provided at the center of the positive electrode 140. The material of the positive-electrode collector 142 may be the same as, or different from, the material of the negative-electrode collector 132. In this embodiment, for example, the material of the positive-electrode collector 142 is the same as that of the negative-electrode collector 132, which is an etched aluminum foil having recessed parts and projecting parts on its surfaces. Also, as with the negative-electrode collector 132, the positive-electrode alkalescent resin layers 145 are provided inside the recessed parts 142b.

For the positive-electrode alkalescent resin layers 145, at least one of ammonium salt of carboxy methyl cellulose, sodium salt of carboxy methyl cellulose, and polyethylene oxide that has been adjusted to alkalinity may be used and, as with the negative-electrode alkalescent resin layers 135, ammonium salt of carboxy methyl cellulose was used in this embodiment.

The positive-electrode conductive layers 146 are formed on the top and bottom surfaces of the positive-electrode collector 142 including the positive-electrode alkalescent resin layers 145. The material of the positive-electrode conductive layers 146 may be the same as, or different from, that of the negative-electrode conductive layers 136, and in this embodiment, the same material as that of the negative-electrode conductive layers 136 was used.

The positive-electrode active material layers 143 are formed on the positive-electrode conductive layers 146. For example, the positive-electrode collector 142 is sandwiched by the positive-electrode active material layers 143 provided on both sides of the positive-electrode collector 142. The material of the positive-electrode active material layers 143 may be the same as, or different from, that of the negative-electrode active material layers 133, and in this embodiment, the same material as that of the negative-electrode active material layers 133 was used.

The separators 150 are provided between the negative electrode 130 and the positive electrode 140. The separators 150 are sheets that allow electrolytic ions to pass through them, but insulate the negative electrode 130 and the positive electrode 140. The separators 150 may be porous sheets made of glass fiber, cellulose fiber, plastic fiber, etc.

The electrolytic solution may be selected as desired. For example, an electrolytic solution containing lithium ions, tetraethyl ammonium ions, triethyl methyl ammonium ions, 5-azoniaspiro [4.4] nonane ions, ethyl methyl imidazolium ions, or the like, as cations; $BF_4^-$ (tetrafluoroborate ions), $PF_6^-$ (hexafluorophosphate ions), $(CF_3SO_2)_2N^-$ (TFSA ions), or the like, as anions; and propylene carbonate, ethylene carbonate, dimethyl carbonate, ethyl methyl carbonate, dimethyl carbonate, sulfolane, dimethyl sulfone, ethyl methyl sulfone, ethyl isopropyl sulfone, or the like, as solvent, may be used. To be specific, propylene carbonate solution of 5-azoniaspiro [4.4] nonane-$BF_4$ or ethyl methyl imidazolium-$BF_4$, or the like, may be used.

[Method for Manufacturing Negative and Positive Electrodes]

Next, a method for manufacturing the aforementioned electrochemical device electrode is explained. Although the explanations provided here pertain to an electrode which will be used as a negative electrode, the same method can also be used to manufacture an electrode which will be used as a positive electrode.

Figure 5:
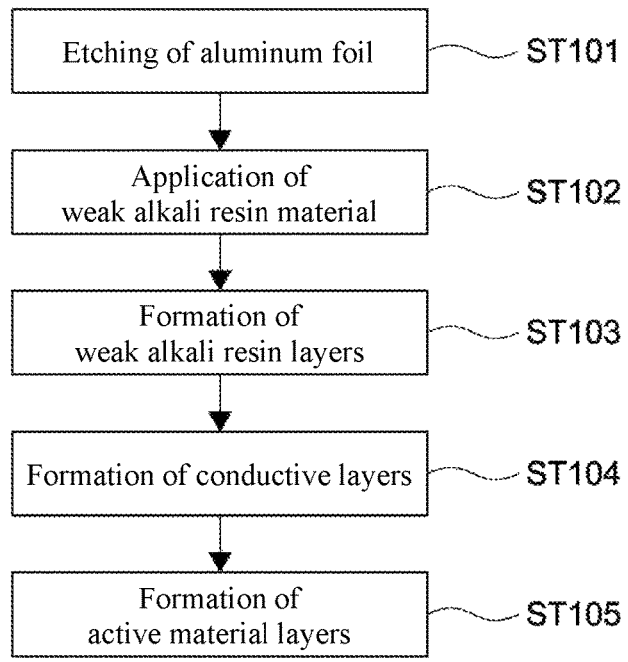
FIG. 5 is a flow chart showing a process of manufacturing an electrochemical device electrode.

FIG. 5 is a flow chart illustrating the process of manufacturing an electrochemical device electrode.

Each step shown in FIG. 5 is explained in detail using FIGS. 6A to 6E below.

FIGS. 6A to 6E are cross sectional views illustrating the process of manufacturing an electrochemical device electrode.

Figure 6A:
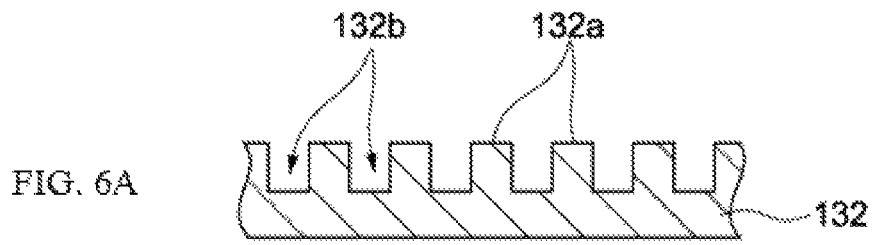
FIGS. 6A to 6E are cross sectional views showing a process of manufacturing an electrochemical device electrode.

First, an aluminum foil is prepared. This aluminum foil is soaked in an aqueous solution of hydrochloric acid, and then alternating current is applied to the aluminum foil to etch it electrochemically. After the etching, the aluminum foil is washed with distilled water to remove the hydrochloric acid. As shown in FIG. 6A, a negative-electrode collector 132 constituted by an etched aluminum foil having recessed parts 132b and projecting parts 132a on its top and bottom sides is obtained through this etching treatment (ST101).

While an etched aluminum foil was used for the etched metal foil in this embodiment, an acid-etched copper foil, nickel foil, etc., may also be used. In addition, while an electrochemical etching treatment is adopted here as the acid etching treatment, an etching treatment that involves soaking in hydrochloric acid, etc., may also be adopted. In addition, while hydrochloric acid was used as the etching treatment solution, other acid, such as sulfuric acid, nitric acid or mixture thereof, may also be used.

Next, an aqueous solution of ammonium salt of carboxy methyl cellulose is prepared as the alkalescent resin material. For the aqueous solution of ammonium salt of carboxy methyl cellulose, ammonium salt of carboxy methyl cellulose was dissolved in distilled water to prepare a 2% aqueous solution.

Figure 6B:
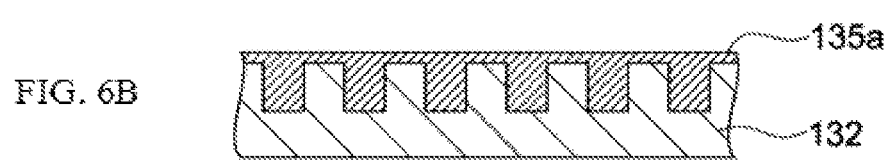

As shown in FIG. 6B, the aqueous solution of ammonium salt of carboxy methyl cellulose 135a (having a pH of 7.2) is applied, as the alkalescent resin material, on the surfaces of the negative-electrode collector 132 by means of gravure printing, for example (ST102).

Figure 6C:
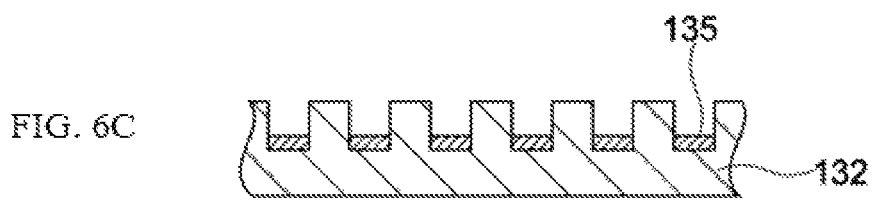

The applied solution is dried to let the moisture evaporate, to form negative-electrode alkalescent resin layers 135, as shown in FIG. 6C (ST103). Here, the concentration and application amount of the aqueous solution of ammonium salt of carboxy methyl cellulose 135a were adjusted in such a way that, once the solution dries, the aluminum foil surface will be virtually exposed in the projecting parts 132a, while negative-electrode alkalescent resin layers 135 will be formed in the recessed parts 132b.

It suffices that the negative-electrode alkalescent resin layers 135 are made of a resin exhibiting weak alkalinity which in turn offers excellent oxidation reduction characteristics, and for the material of the negative-electrode alkalescent resin layers 135, aqueous solution of sodium salt of carboxy methyl cellulose, aqueous solution prepared by adding aqueous solution of diluted sodium carbonate to aqueous solution of polyethylene oxide, or the like, may be used, for example, in addition to aqueous solution of ammonium salt of carboxy methyl cellulose.

Figure 6D:
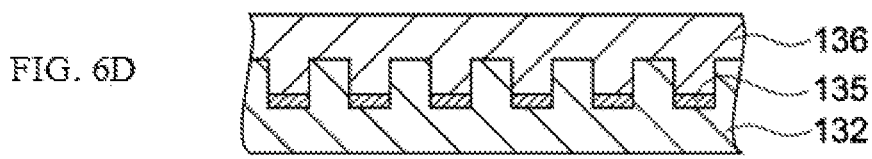

Next, as shown in FIG. 6D, a conductive material is applied on the negative-electrode alkalescent resin layers 135 and negative-electrode collector 132, after which the conductive material is dried to form negative-electrode conductive layers 136 (ST104).

The conductive material is applied in a standard atmosphere, for example. The negative-electrode conductive layers 136 are formed in such a way that some parts of them enter the recessed parts 132b and contact the negative-electrode alkalescent resin layers 135, while some other parts of the negative-electrode conductive layers 136 contact the negative-electrode collector 132 directly.

For the conductive material, a water-based liquid in which a conductive medium has been dispersed is used. The conductive medium is at least one of carbon black, graphite, and the like, for example.

Figure 6E:
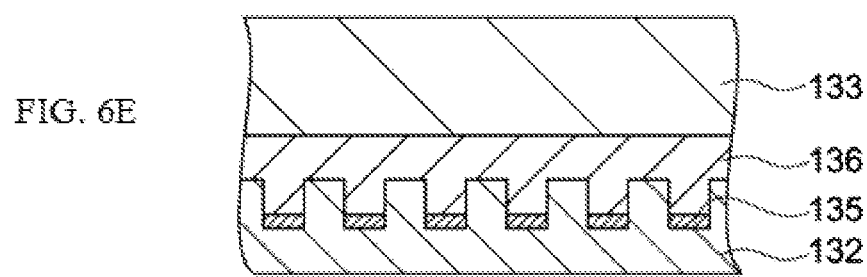

Next, as shown in FIG. 6E, an active material layer formation paste is applied on the negative-electrode conductive layers 136 by means of printing, after which the applied layers are dried by blown hot air, placement in a drying oven, or other method, to form negative-electrode active material layers 133 (ST105).

The active material layer formation paste contains active material powder, binder, conductive auxiliary agent, and solvent.

For the active material powder, one constituted by active carbon, artificial graphite, PAS, etc., may be used, and in this embodiment, active carbon was used.

For the binder, styrene butadiene rubber (SBR), carboxy methyl cellulose (CMC), polyethylene, polypropylene, polyethylene terephthalate, aromatic polyamide, fluororubber, polyvinylidene fluoride, isoprene rubber, butadiene rubber, ethylene propylene rubber, etc., may be used, and in this embodiment, styrene butadiene rubber was used.

For the conductive auxiliary agent, acetylene black, graphite, carbon black, Ketjenblack, carbon nanotubes, etc., may be used, and in this embodiment, Ketjenblack was used.

For the solvent, water, N-methyl pyrrolidone (NMP), or other solvent may be used, and in this embodiment, water was used.

The negative electrode 130 is formed through such manufacturing processes (ST101 to ST105).

According to the negative electrode 130 pertaining to the present invention, wherein negative-electrode alkalescent resin layers 135 are provided inside the recessed parts 132b of the etched negative-electrode collector 132, the residue of the acid used for etching is neutralized by the negative-electrode alkalescent resin layers 135 and thus the remaining acid is prevented from reaching the negative-electrode conductive layers 136 and negative-electrode active material layers 133. This prevents the negative-electrode conductive layers 136 and negative-electrode active material layers 133 from being altered by the acid, and separating as a result, and consequently stable capacitor characteristics can be obtained for an extended time.

It should be noted that the construction of the positive electrode 140 is the same as that of the negative electrode 130, and the same effects as those achieved by the negative electrode 130 can also be obtained by the positive electrode 140.

[Evaluation of Electrochemical Device Electrode]

A float test was conducted on an electrochemical device electrode pertaining to the aforementioned embodiment, as well as an electrochemical device electrode provided as a comparative example, and ESR (equivalent series resistance) was measured.

Figure 7:
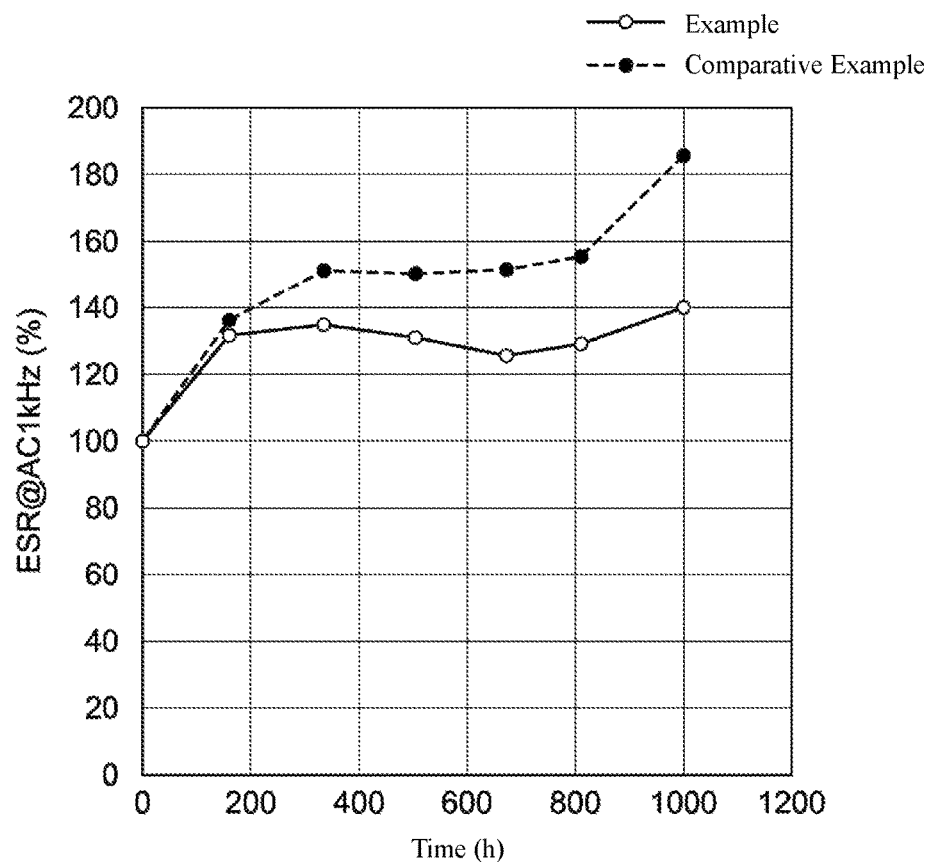
FIG. 7 is a graph showing an ESR (equivalent series resistance) comparison.

FIG. 7 is a graph showing an ESR (equivalent series resistance) comparison. In FIG. 7, the horizontal axis represents the duration of the float test, while the orthogonal axis represents how much the ESR measured after the float test changed with respect to the ESR value measured in the initial state when the float test was not yet conducted. In FIG. 7, the dotted line shows the result of the comparative example, while the solid line shows the result of the example.

For the electrochemical device electrode pertaining to this embodiment (example), one manufactured according to the aforementioned manufacturing method was prepared. For the electrochemical device electrode pertaining to the comparative example, one constituted by an etched aluminum foil as a current collector that was given an etching treatment similar to that of the electrochemical device electrode pertaining to this embodiment, where conductive layers and active material layers similar to those of the capacitor electrode pertaining to this embodiment were formed one by one on this current collector, was prepared. In other words, the only constitutional difference between the example and the comparative example is whether or not there are alkalescent resin layers.

Capacitor cells were produced using both electrochemical device electrodes.

Next, the capacitor cells were charged in a thermostatic chamber adjusted to 70° C., at a voltage of 2.5 V (float test). As shown in FIG. 7, the rise in ESR during the float test was smaller with the capacitor cell using the electrochemical device electrode pertaining to this embodiment (example), than with the capacitor cell in the comparative example. After 1,000 hours of float test, for example, the ESR rose 180% or more from the initial value in the comparative example; whereas, in the example, the rise was 140%, which was smaller than in the comparative example.

The above confirmed that, by providing alkalescent resin layers, an electrochemical device having stable capacitor characteristics for an extended time could be obtained.

While the aforementioned embodiment illustrated an electrical double-layer capacitor as the electrochemical device 100, the present invention is not limited to this example. For example, the aforementioned embodiment may be applied to the positive electrode of a lithium ion capacitor. Alternately, the aforementioned embodiment may be applied to an electrode of a lithium ion battery.

If the aforementioned embodiment is applied to a lithium ion capacitor, the negative-electrode collector 132 of the negative electrode 130 is a copper foil or other metal foil, for example. Also, the negative-electrode active material contained in the negative-electrode active material layers 133 is a material capable of occluding the lithium ions contained in the electrolytic solution, and non-graphitizing carbon (hard carbon), graphite, soft carbon, or other carbon material may be used, for example.

Also, while the electrodes in the aforementioned embodiment were constituted by a current collector with alkalescent resin layers, conductive layers, and active material layers provided on both sides thereof, they may be constituted by a current collector with an alkalescent resin layer, conductive layer, and active material layer provided on one side thereof.

The above explained an embodiment of the present invention; however, the present invention is not limited to the aforementioned embodiment in any way, and it goes without saying that various changes can be added thereto.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-132233, filed Jul. 4, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. An electrochemical device electrode having:
   a current collector which is an acid-etched metal foil whose surface has concavities;
   alkalescent resin layers which are formed and desiccated inside the concavities of the current collector and whose pre-desiccated state exhibit weak alkalinity; and
   conductive layers which are formed on the current collector and alkalescent resin layers, which contain conductive material, and which are electrically connected to the current collector; and
   active material layers formed on the conductive layers.

2. An electrochemical device electrode according to claim 1, wherein a pH of the alkalescent resin layers in the pre-desiccated state is about 7.2 or higher but no higher than about 8.5.

3. An electrochemical device electrode according to claim 1, wherein the alkalescent resin layers are made of at least one of ammonium salt of carboxy methyl cellulose, sodium salt of carboxy methyl cellulose, and polyethylene oxide adjusted to alkalinity.

4. An electrochemical device electrode according to claim 1, wherein the metal foil is an aluminum foil.

5. An electrochemical device electrode according to claim 1, wherein the active material layers contain active material and resin that includes at least one of styrene butadiene rubber, polyvinylidene fluoride, tetrafluoroethylene (PTFE), acrylic resin, polyimide resins, and polyamide resin.

6. An electrochemical device electrode according to claim 1, wherein the alkalescent resin layers are in contact with and covers only partially surfaces of the concavities, wherein all other parts of the surfaces of the concavities are not covered with the alkalescent resin layers.

7. An electrochemical device comprising:
   electrochemical device electrodes, at least one of which is an electrochemical device of claim 1; and
   a separator which separates the electrochemical device electrodes.

8. A method for manufacturing electrochemical device electrode, comprising:
   etching a current collector, which is a metal foil, using an acid, to form recesses and projections on its surfaces;
   applying and then drying an alkalescent resin material on surfaces of the current collector, to form alkalescent resin layers in the recessed parts of the current collector;

forming conductive layers on the current collector and alkalescent resin layers; and forming active material layers on surfaces of the conductive layers.

9. A method for manufacturing electrochemical device electrode according to claim 8, wherein the alkalescent resin material is at least one of aqueous solution of ammonium salt of carboxy methyl cellulose, aqueous solution of sodium salt of carboxy methyl cellulose, and aqueous solution prepared by adding aqueous solution of diluted sodium carbonate to aqueous solution of polyethylene oxide.

* * * * *